(12) United States Patent
Hong

(10) Patent No.: US 11,351,818 B2
(45) Date of Patent: Jun. 7, 2022

(54) SPIRAL SPRING WHEEL

(71) Applicant: Sun T. Hong, San Jose, CA (US)

(72) Inventor: Sun T. Hong, San Jose, CA (US)

( * ) Notice: Subject to any disclaimer, the term of this patent is extended or adjusted under 35 U.S.C. 154(b) by 135 days.

(21) Appl. No.: 16/928,209

(22) Filed: Jul. 14, 2020

(65) Prior Publication Data

US 2022/0016931 A1    Jan. 20, 2022

(51) Int. Cl.
*B60C 7/20* (2006.01)
*B60B 9/08* (2006.01)

(52) U.S. Cl.
CPC . *B60C 7/20* (2013.01); *B60B 9/08* (2013.01)

(58) Field of Classification Search
CPC .... B60C 7/20; B60C 7/14; B60B 9/08; B60B 9/04; B60B 9/12
See application file for complete search history.

(56) References Cited

U.S. PATENT DOCUMENTS

| | | | | |
|---|---|---|---|---|
| 1,048,813 A * | 12/1912 | Doll | ........................ | B60B 9/26 152/13 |
| 1,164,887 A * | 12/1915 | Strauch | .................... | B60B 9/26 152/84 |
| 1,225,042 A * | 5/1917 | Lambert | .................. | B60C 7/14 152/273 |
| 5,125,443 A * | 6/1992 | Schwartzman | .......... | B60B 9/26 152/69 |
| 2009/0211675 A1* | 8/2009 | Louden | .................... | B60B 9/02 152/55 |
| 2011/0108173 A1* | 5/2011 | Abe | ........................ | B60C 11/04 152/76 |
| 2011/0240189 A1* | 10/2011 | Dutton | ..................... | B60B 9/26 152/1 |
| 2011/0248554 A1* | 10/2011 | Chon | ....................... | B60C 7/18 301/63.102 |
| 2020/0009916 A1 | 1/2020 | Thompson et al. | | |
| 2020/0070576 A1 | 3/2020 | Nakajima | | |
| 2020/0139754 A1 | 5/2020 | Youn et al. | | |
| 2020/0139763 A1 | 5/2020 | Youn et al. | | |

FOREIGN PATENT DOCUMENTS

AU    2018201991 A1 * 10/2018

* cited by examiner

*Primary Examiner* — S. Joseph Morano
*Assistant Examiner* — Emily G. Castonguay
(74) *Attorney, Agent, or Firm* — Douglas L. Weller

(57) ABSTRACT

A spiral spring wheel includes a ring spring and a leaf spring assembly surrounding an outer surface of the ring spring. A shoe is placed over the leaf spring assembly. The shoe sidewalls extend past the leaf spring assembly and tuck under the ring spring. Each torsion spring in a first plurality of torsion springs extends in a clockwise spiral shape from a flange to an inner surface of the ring spring. Each torsion spring in a second plurality of torsion springs extends in a counterclockwise spiral shape from the flange to the inner surface of the ring spring.

20 Claims, 15 Drawing Sheets

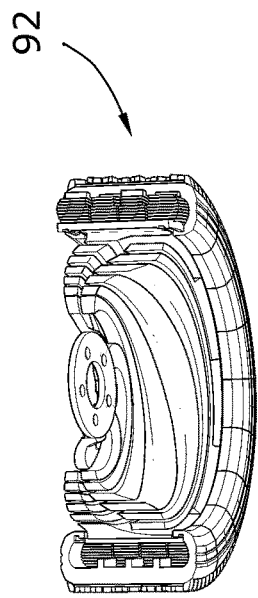
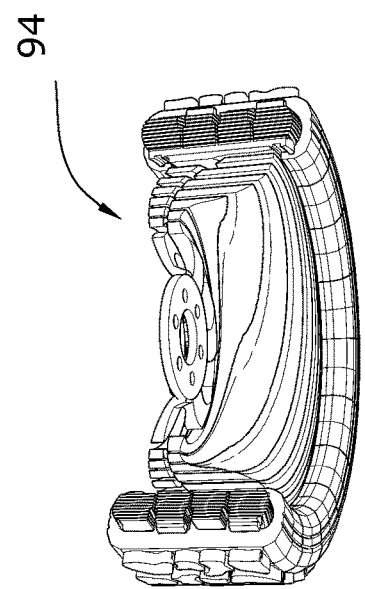
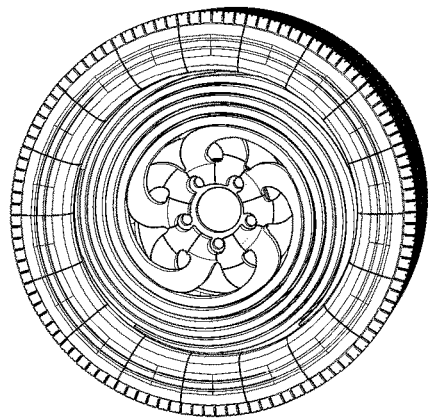
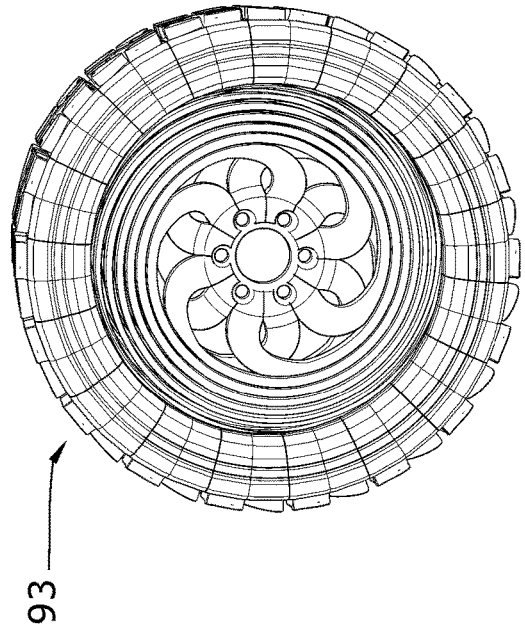
FIG. 15
FIG. 16

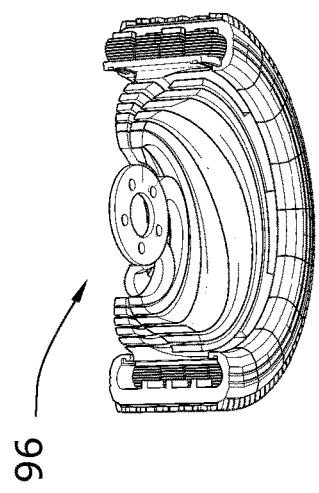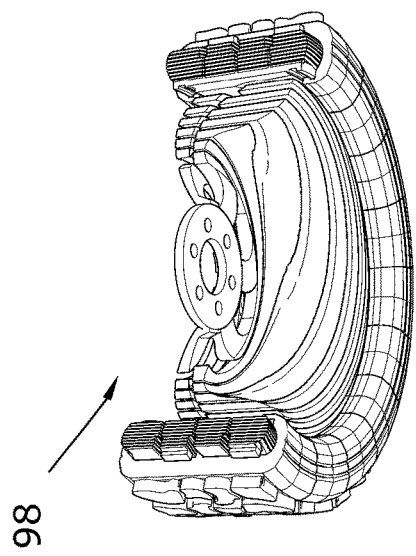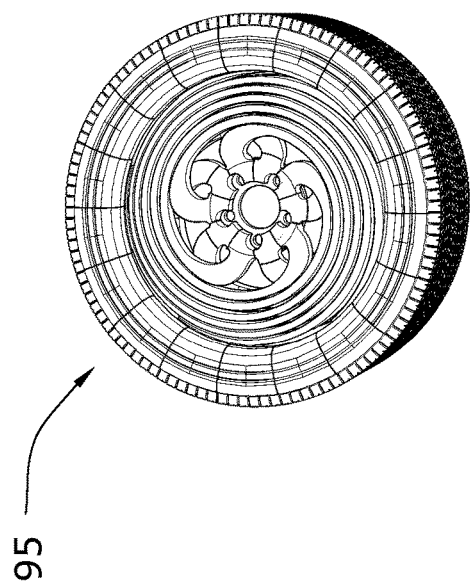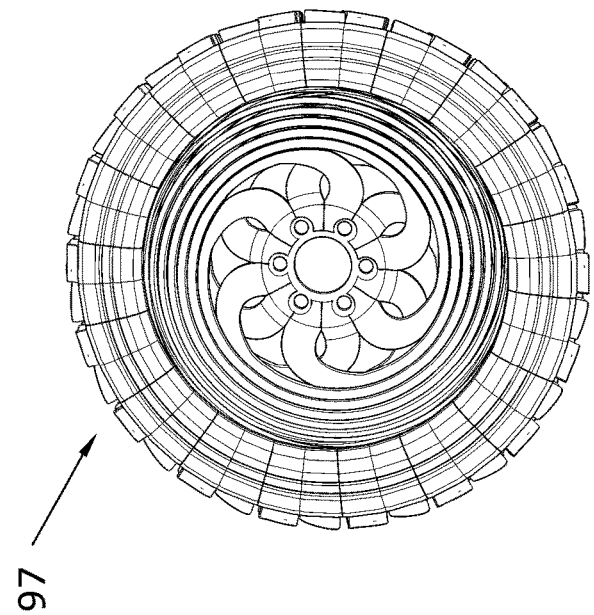
FIG. 17
FIG. 18

SPIRAL SPRING WHEEL

BACKGROUND

An automobile tire is typically pneumatic and is composed of multiple parts such as an inner liner, a tire bead, tire plies. Tire belts, tire tread, tire sipes, tire grooves, a tire shoulder and a sidewall. The inner liner is the innermost layer of a tubeless tire and prevents air from escaping the tire. A tire bead is a rubber-coated loop of high-strength steel cable that allows a tire to stay seated on a rim. Tire plies, consist of strong material such as polyester cord coated with rubber to help bond with other plies and belts to seal in air. Plies run perpendicular to the tire tread and give tires strength and resistance to road damage. Tire belts are rubber-coated layers of steel, fiberglass, rayon, and other materials. Tire belts are located between the tire tread and tire plies, and crisscross at angles to hold the plies in place. Belts provide resistance to punctures and help treads stay flat and in contact with the road. The sidewall protects cord plies.

Non-pneumatic tires are available for some applications and generally are composed largely of synthetic resin material such as a resin composition, polymer resin and elastomer. For both pneumatic and non-pneumatic tires, tire tread is the portion of the tire that comes in contact with the road. Tire sipes are slits within the tire tread placed to improve traction on dirt, gravel sand and when road surfaces are wet or covered with snow. Tire grooves are the spaces between two adjacent tread ribs that are situated to allow water to escape from under a tire. The tire shoulder is the outer edge of the tread that wraps into the sidewall area. The sidewall protects cord plies. Typically tire markings are placed on sidewalls to provide information such as tire size and type.

BRIEF DESCRIPTION OF THE DRAWINGS

FIG. 15, FIG. 16, FIG. 17 and FIG. 18 illustrate different configurations of spiral spring wheels used for different types of vehicles.

DETAILED DESCRIPTION

Figure 2:
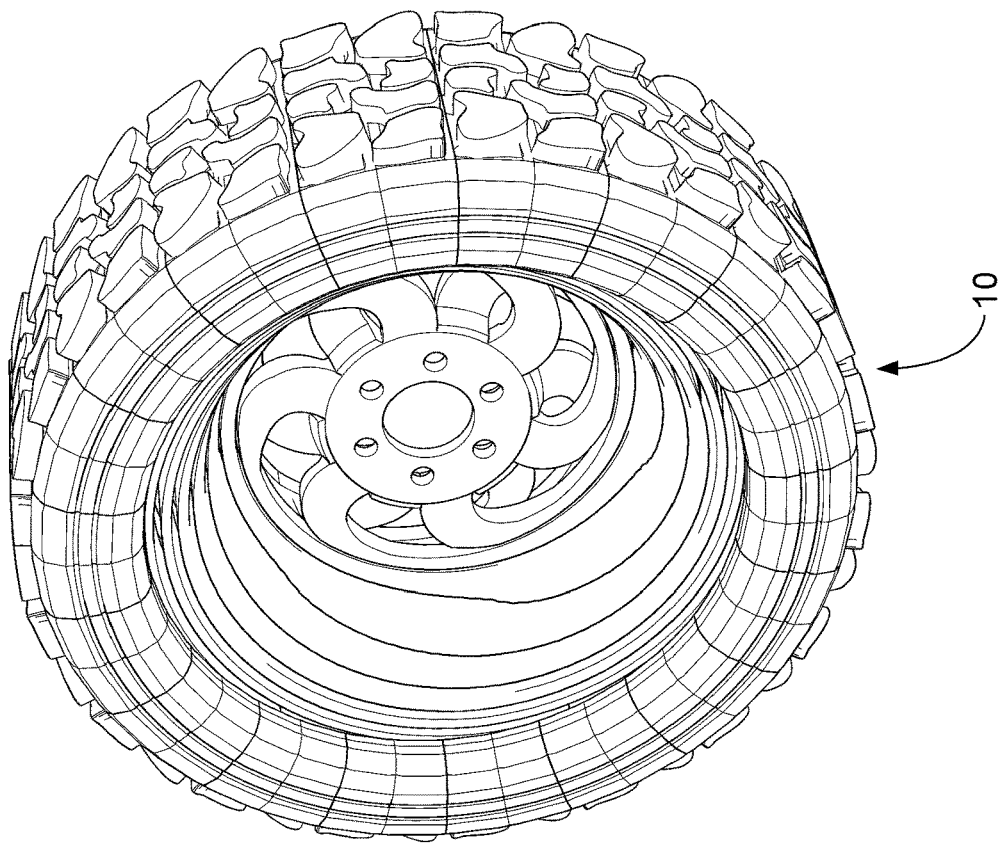
FIG. 1 and FIG. 2 show two views of a spiral spring wheel.
Figure 1:
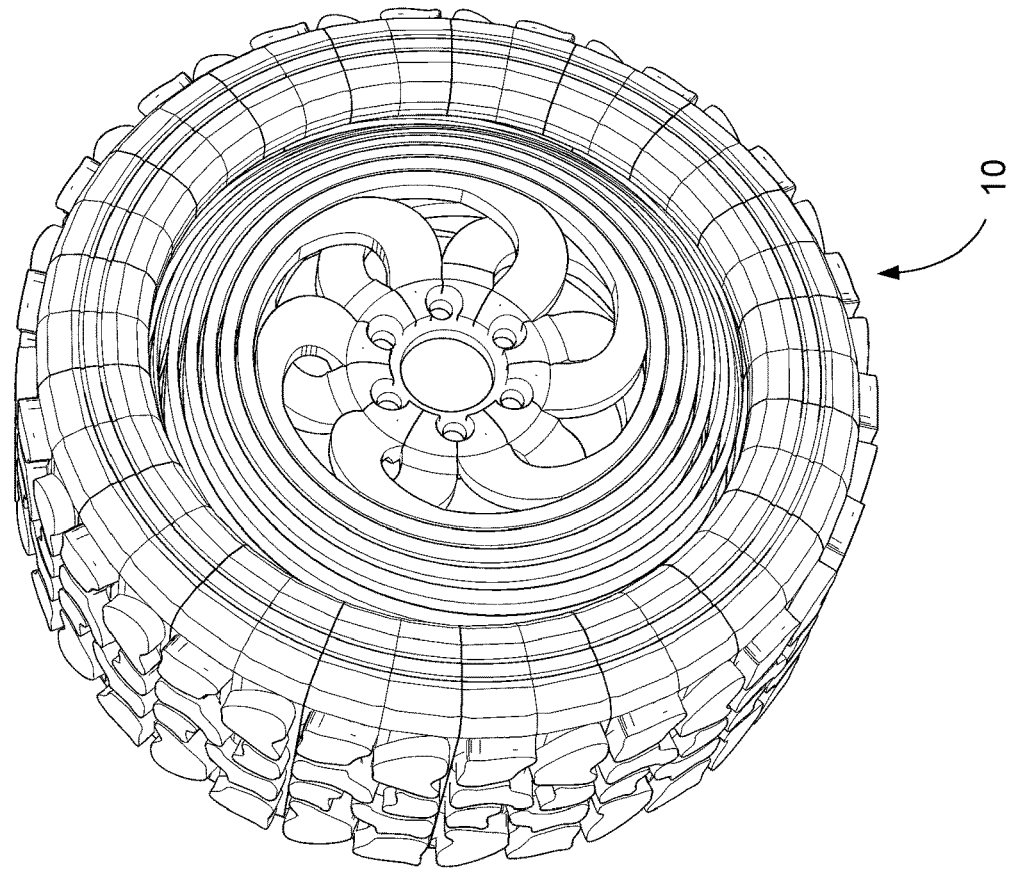

FIG. 1 shows a front view of a spiral spring wheel 10. The front view is how spiral spring wheel 10 would be seen when placed on a motor vehicle. FIG. 2 shows a back view of spiral spring wheel 10.

Figure 3:
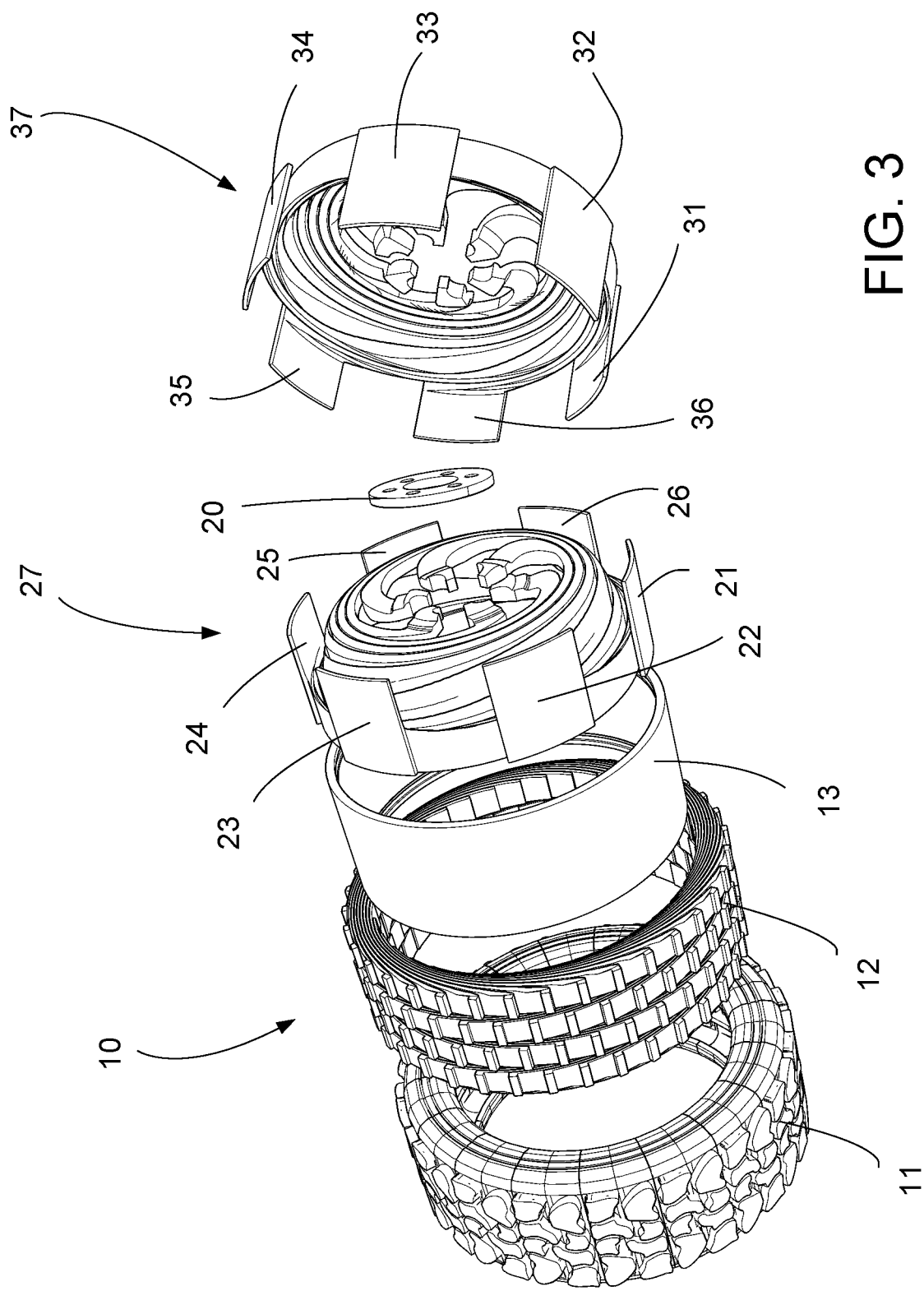
FIG. 3 shows an expanded view of a spiral spring wheel.

FIG. 3 shows an expanded view of spiral spring wheel 10. A shoe 11 is composed of rubber and may include a combination of other material such as rubber-coated high-strength steel cable, rubber coated polyester cord and/or rubber-coated layers of steel, fiberglass, rayon, and other materials. Tire tread, tire sipes and tire grooves are configured based on desired safety, performance and comfort features based upon intended use of spiral spring wheel 10.

A leaf spring assembly 12 is composed of, for example, alloyed steel. Leaf spring assembly 12 is attached to the inside of shoe 11 and the outside of a ring spring 13. Ring spring 13 is composed of, for example, alloyed steel.

A main clockwise torsion spring assembly 27 includes a torsion spring 21, a torsion spring 22, a torsion spring 23, a torsion spring 24, a torsion spring 25 and a torsion spring 26. Each of the torsion springs is composed of, for example, alloyed steel. A main counterclockwise torsion spring assembly 37 includes a torsion spring 31, a torsion spring 32, a torsion spring 33, a torsion spring 34, a torsion spring 35 and a torsion spring 36. Each of the torsion springs is composed of, for example, alloyed steel.

Figure 14:
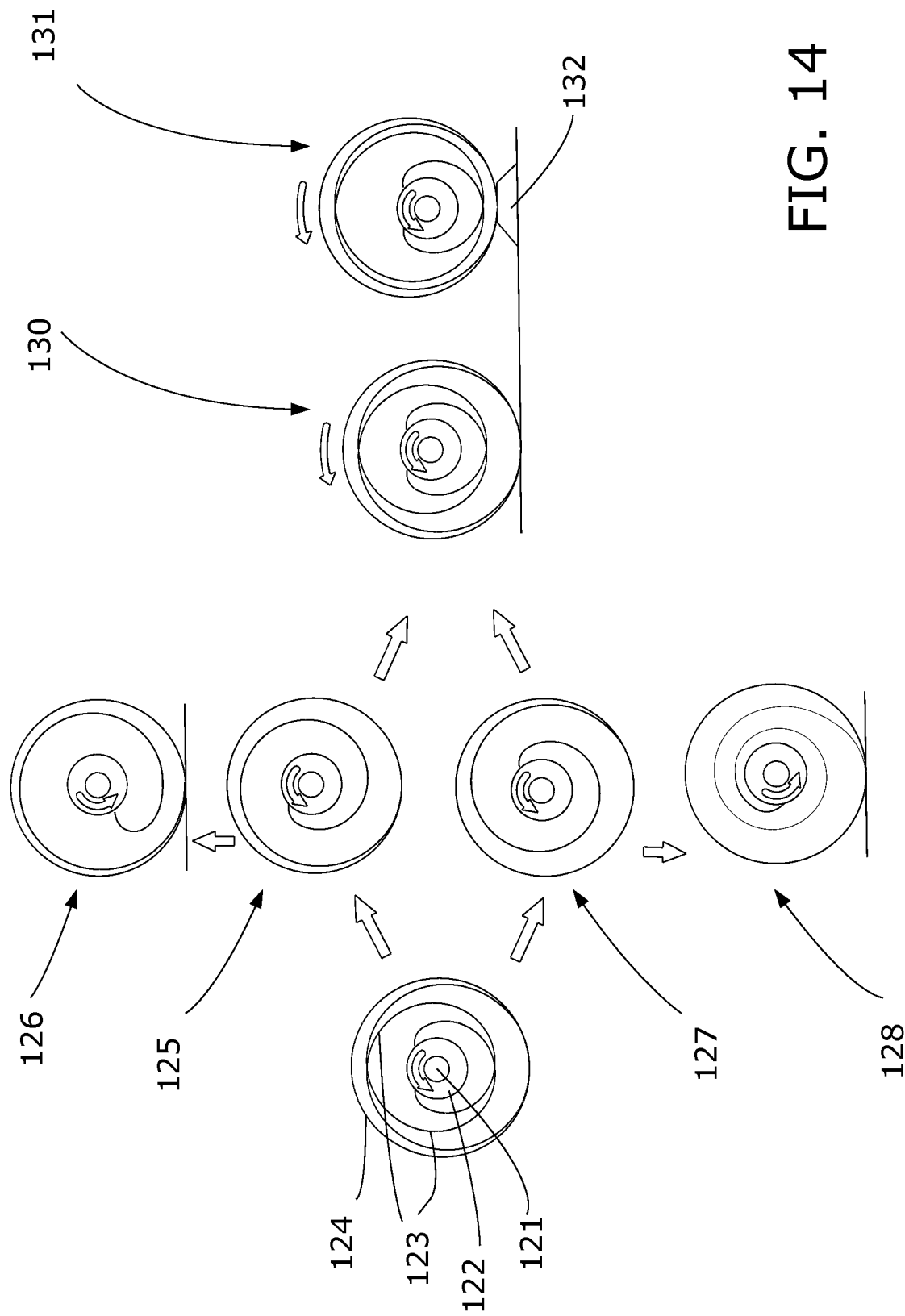

The torsion springs of main counterclockwise torsion spring assembly 37 are wound in the opposite direction of the torsion springs of main clockwise torsion spring assembly 27. This guards against a turning affect where the motion of a turning wheel and rolling resistance tends to wind or unwind a spiral spring assembly. Because torsion springs of main counterclockwise torsion spring assembly 37 are wound in the opposite direction of the torsion springs of main clockwise torsion spring assembly 27, when the motion of turning of spiral spring wheel 10 tends to unwind the spiral torsion springs main counterclockwise torsion spring assembly 37, this same motion will tend to wind the spiral torsion springs main counterclockwise torsion spring assembly 27. Likewise, when the motion of turning of spiral spring wheel 10 tends to unwind the spiral torsion springs main counterclockwise torsion spring assembly 27, this same motion will tend to wind the spiral torsion springs main counterclockwise torsion spring assembly 37. The tendency of the one set of torsion spring assembly to unwind is offset by the tendency of the other set of torsion spring assembly to wind, so spiral wheel 10 remains intact. Nevertheless, spiral wheel 10 will still provide up and down cushioning for up and down motion as illustrated by FIG. 14 and further described below.

As discussed above, leaf spring assembly 12, ring spring 13 and the torsion springs can be composed of alloyed steel. Alloyed steel is steel that is alloyed with a variety of elements to improve mechanical properties. For leaf spring assembly 12, ring spring 13 and the torsion springs the particular alloys used are selected to provide strength, toughness, ductility and resistance to corrosion. Ratios of strength to ductility are chosen, for example, based on the size of the wheel, the size of the part, the estimated weight bearing and the level of ductility required for correct operation. Other materials can be used provided the materials provide the desired amount of strength, toughness, ductility and resistance to corrosion.

The inside end of each of torsion springs 21 through 26 and torsion springs 31 through 36 is attached to a flange 20. Flange 20 is composed of, for example, steel, iron or alloyed steel. For example flange 20 includes a bolt hole for each of torsion springs 21 through 26 which are configured to allow attachment to a motor vehicle.

Figure 4:
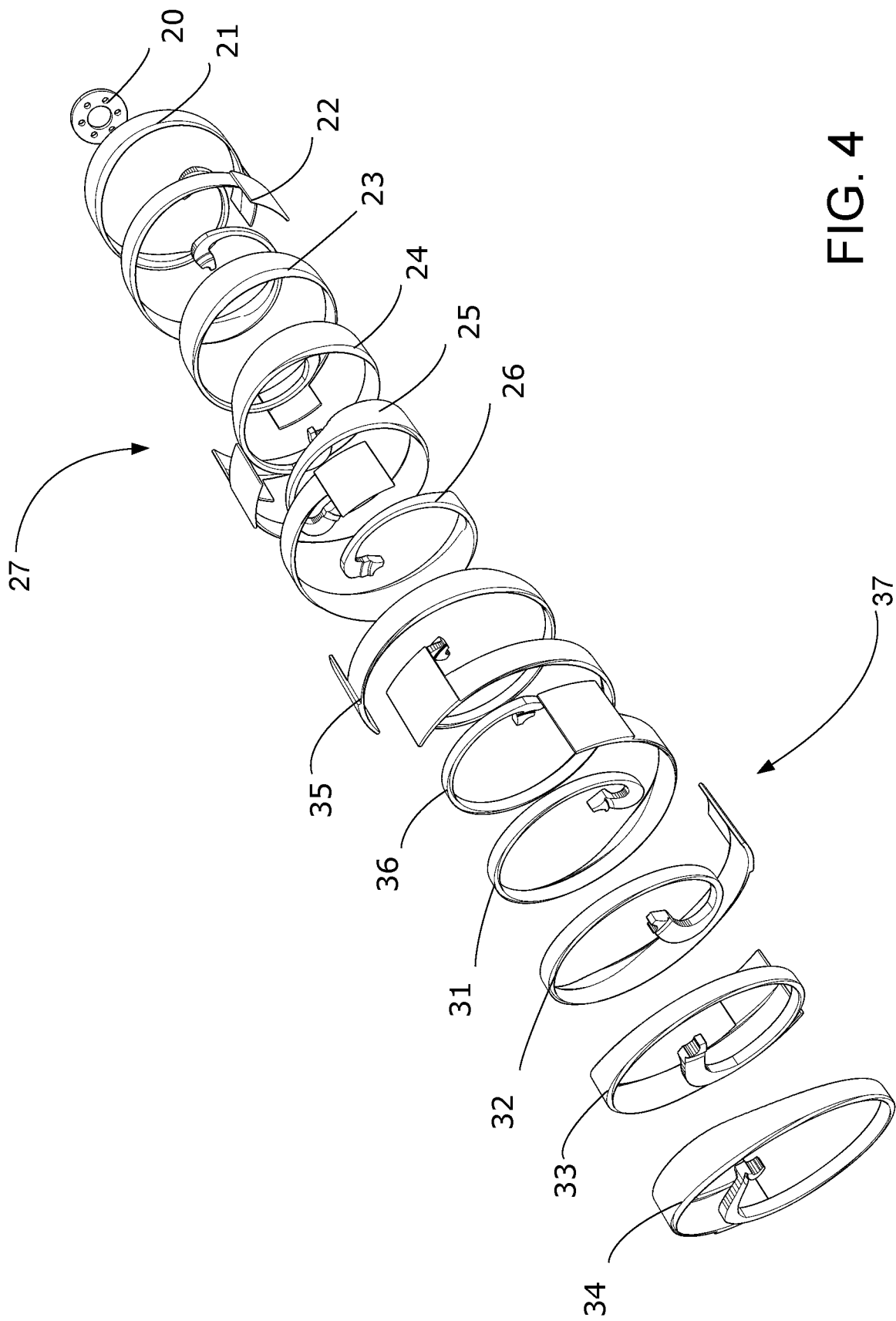
FIG. 4 shows torsion springs used in a spiral spring wheel.

FIG. 4 is an exploded view of main clockwise torsion spring assembly 27 and main counterclockwise torsion spring assembly 37 that shows additional detail of the spiral shape of torsion springs 21 through 26 and torsion springs 31 through 36. The materials and dimensions of the torsion springs 21 through 26 and torsion springs 31 through 36 are selected to provide a target amount of spring elasticity based on the weight to the vehicle to be supported by spiral spring wheel 1. The materials and dimensions of the torsion springs 21 through 26 and torsion springs 31 through 36 may also be varied to adjust the amount of elasticity and resilience required for particular applications, to maximize safety and durability and to meet particular preferences of ride performance and comfort.

Figure 5:
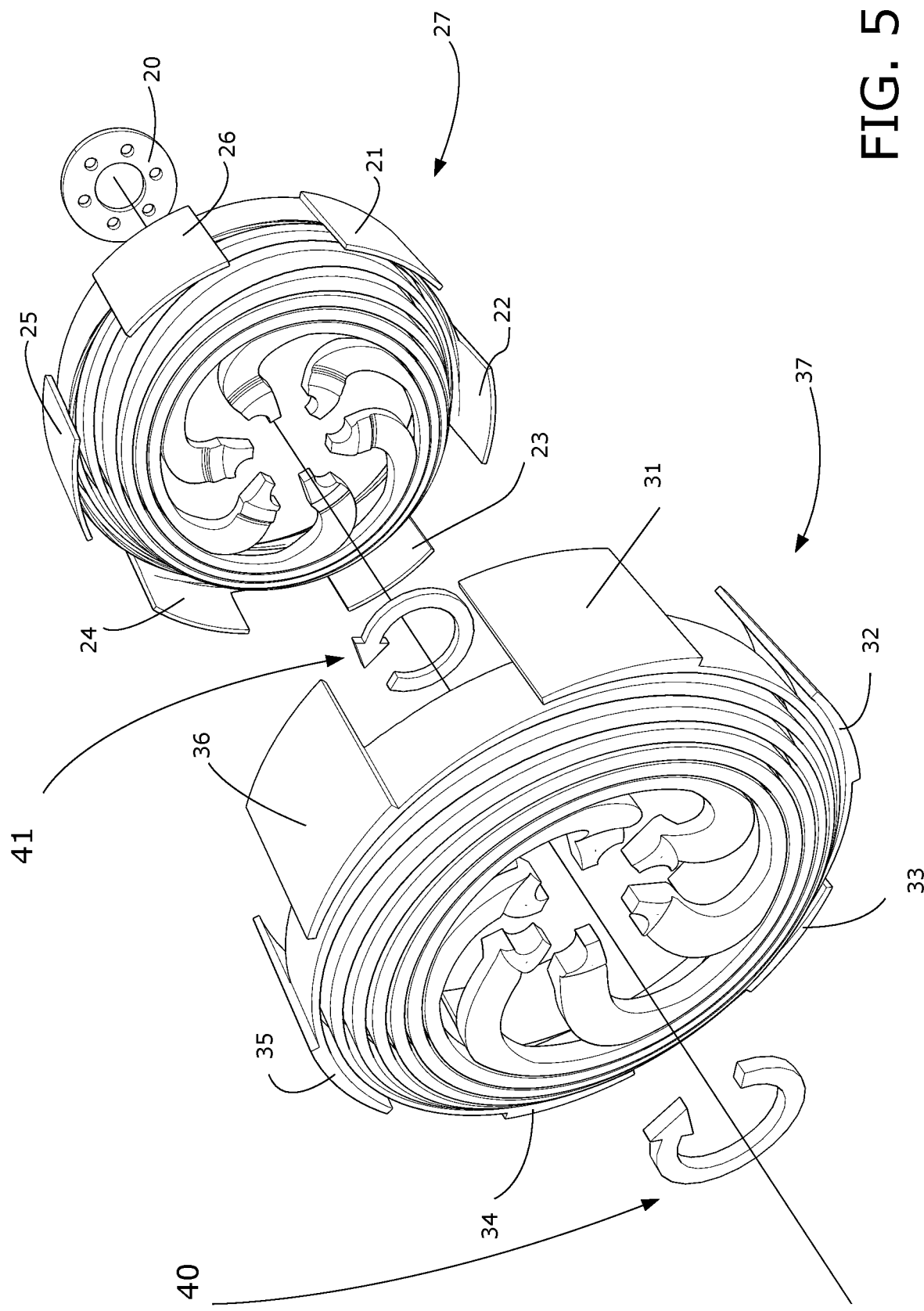
FIG. 5 illustrates assembly of torsion springs used in a spiral spring wheel.

FIG. 5 shows main clockwise torsion spring assembly 27 oriented for incorporation with main counterclockwise torsion spring assembly 37. Arrow 40 indicates a turning direction in which torsion spring assembly 37 is affected when receiving an impact. Arrow 41 indicates a turning direction in which torsion spring assembly 27 is affected when receiving an impact.

Figure 6:
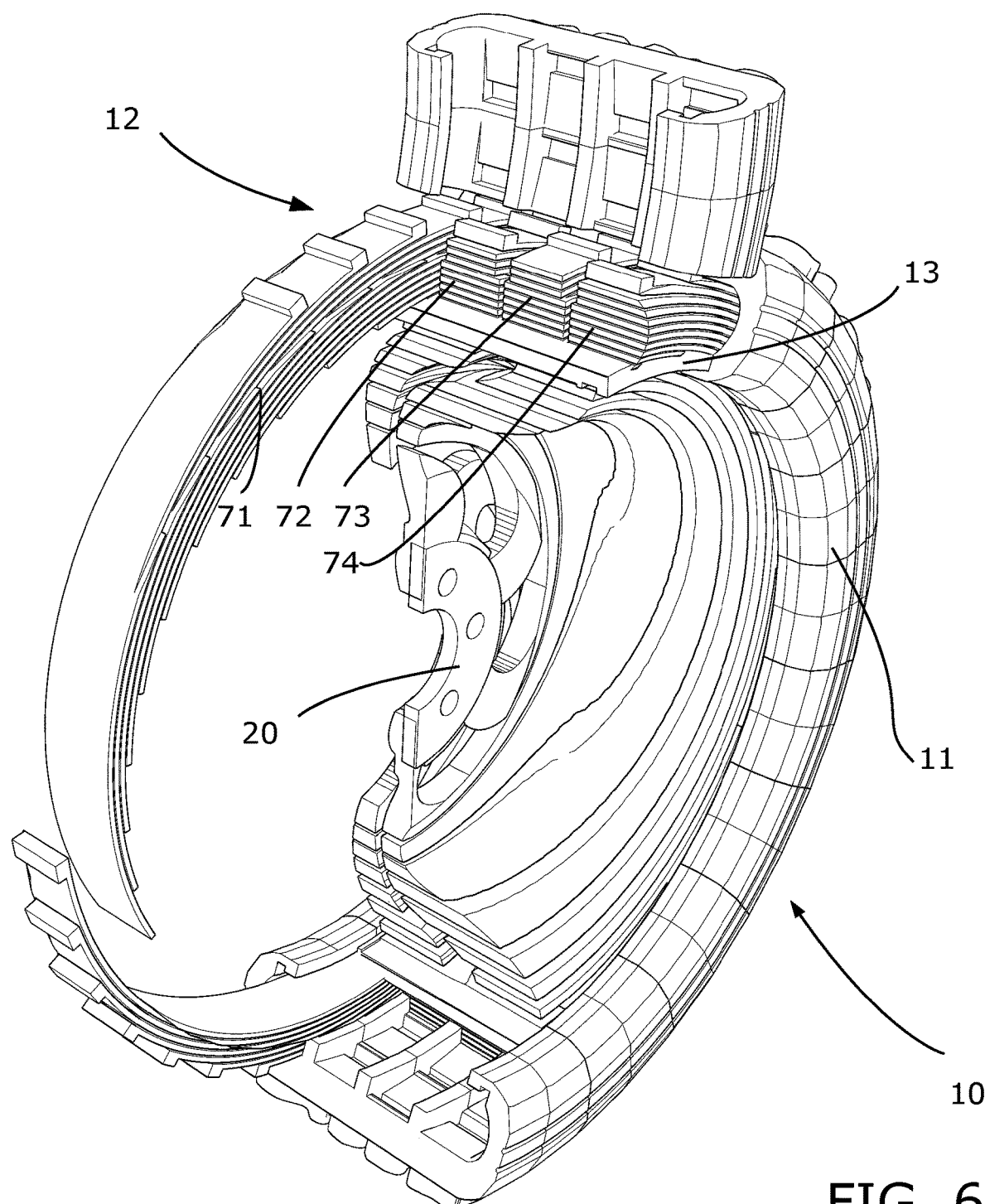
FIG. 6 is a sectional view illustrating assembled composition of a spiral spring wheel.

FIG. 6 shows a partial sectional view of spiral spring wheel 10. The inner surface of shoe 11 is shown to have various convex and concave patterns selected to help secure leaf spring assembly 12 to shoe 11.

Figure 7:
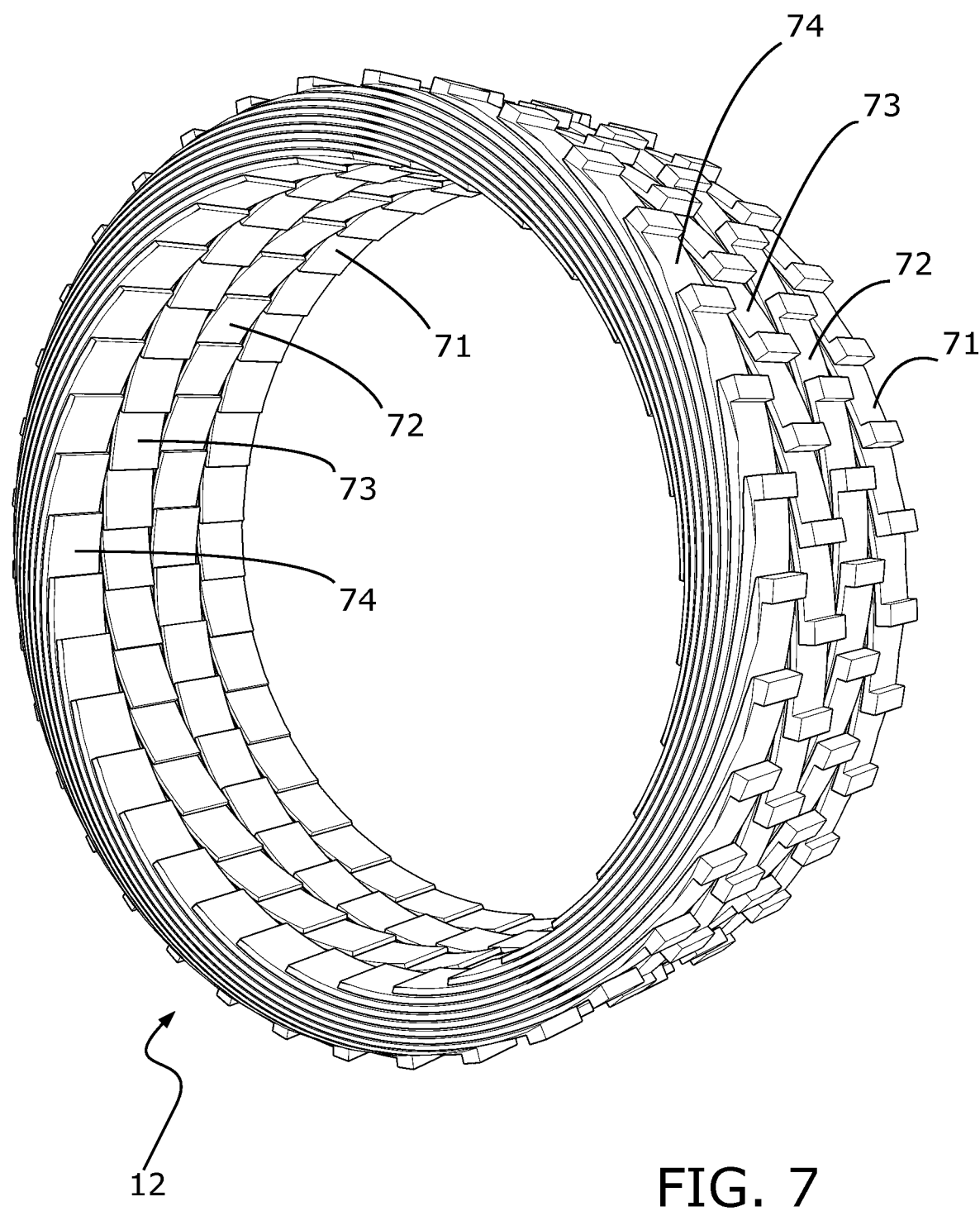
FIG. 7 shows leaf springs within a spiral spring wheel.

In FIG. 6 and FIG. 7, leaf spring assembly 12 is shown to have a leaf spring group 71, a leaf spring group 72, a leaf spring group 73 and a leaf spring group 74. As shown in FIG. 7, each leaf spring group includes, for example, thirty-six leaf springs, with each leaf spring having a protuberance that fits into a matching slot within shoe 11. The number of leaf groups and the number leaf springs in each leaf group will vary based on application, performance requirements, etc.

As shown in FIG. 6 and FIG. 7, wrapping direction alternates for each leaf spring group to guard against any turning effect that could occur if all leaf spring groups were wrapped in the same direction. As shown in FIG. 6, the sidewalls of shoe 11 wraps under ring spring 13 to tightly lock in leaf spring assembly 12 between shoe 11 and ring spring 13. For example, ridges on each side of ring spring 13 lock into grooves at the bottom the sidewalls of shoe 11 to add further security and to prevent gravel and other road sources of contamination to penetrate into leaf spring assembly 12.

As shown in FIG. 6, ridges along the inner surface of shoe 11 form a separate slot for each of leaf spring group 71, leaf spring group 72, leaf spring group 73 and leaf spring group 74. The slots separate leaf spring group 71, leaf spring group 72, leaf spring group 73 and leaf spring group 74 and hold leaf spring group 71, leaf spring group 72, leaf spring group 73 and leaf spring group 74 in position between ring spring 13 and shoe 11.

Figure 8:
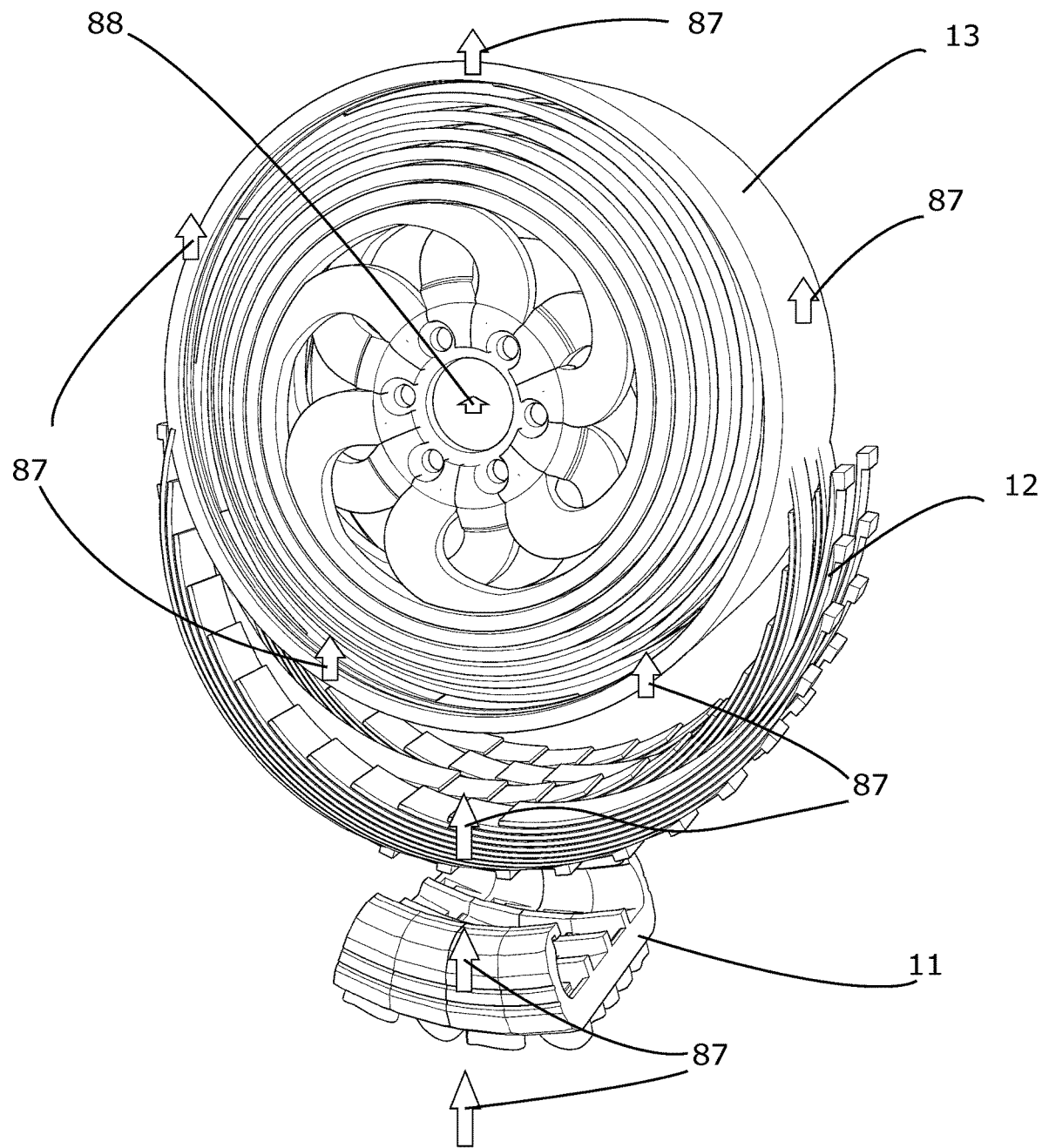
FIG. 8 is used to discuss tension flow within a spiral spring wheel.

Arrows 87 of FIG. 8 illustrates how pressure from the ground through shoe 11 gets transmitted from leaf spring assembly 12 to ring spring 13. Ring spring 13 puts upward pressure on the torsion springs of main clockwise torsion spring assembly 27 and main counterclockwise torsion spring assembly 37. This upward pressure is from there transmitted to flange 20 and the wheel shaft of the vehicle. The resulting spring effect provided by leaf spring assembly 12, main clockwise torsion spring assembly 27 and main counterclockwise torsion spring assembly 37 provide an impact force absorption effect much similar to the impact force absorption effect provided by inflatable tire. Because of the spring effect, the resulting impact force experienced by the shaft, as illustrated by arrow 88, is greatly reduced.

Figure 9:
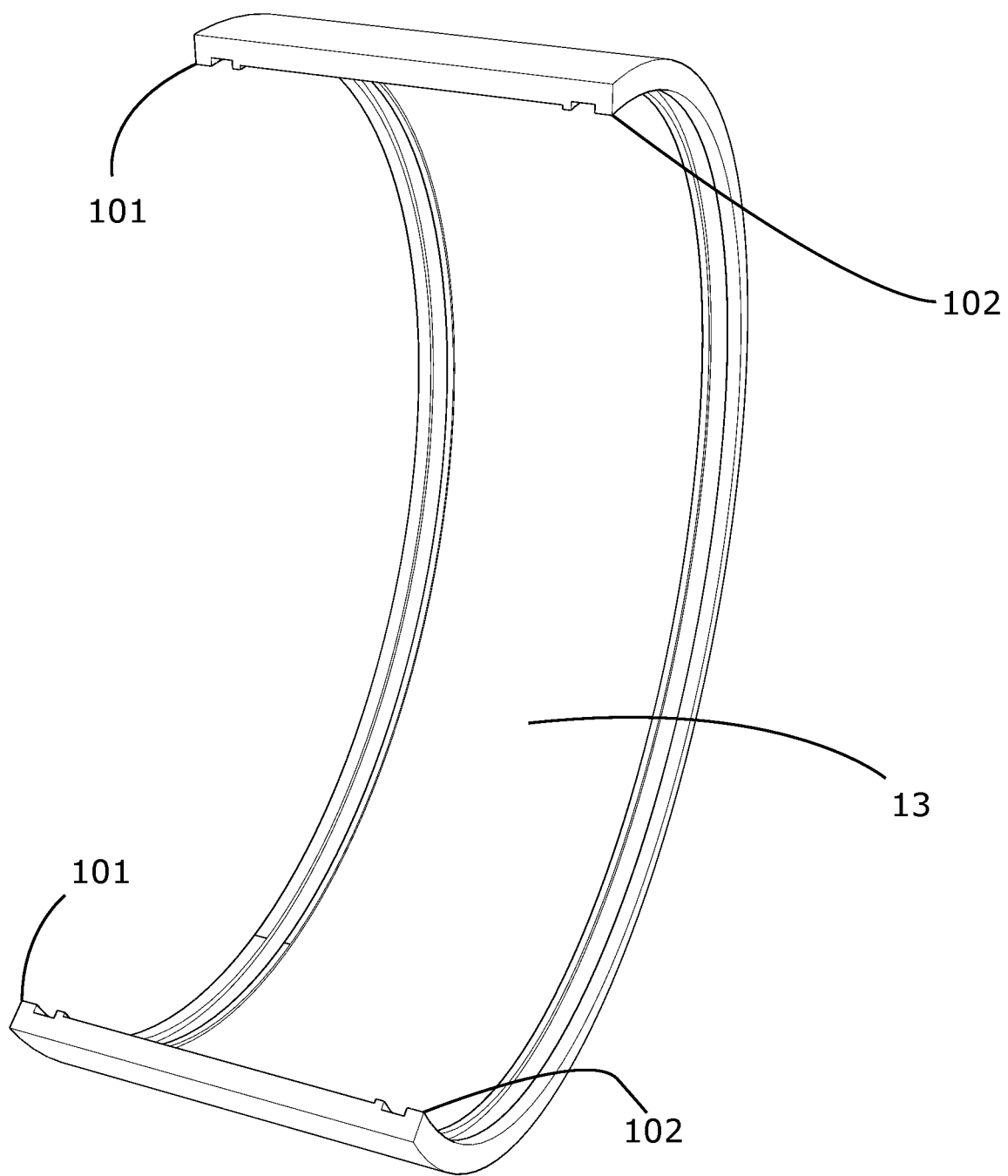
FIG. 9 shows a ring spring used for a spiral spring wheel.

FIG. 9 shows a ridge 101 and a ridge 102 on sides of ring spring 13. The resulting slot helps to secure shoe 11 to ring spring 13 and helps to prevent gravel and other road sources of contamination to penetrate into leaf spring assembly 12

Figure 10:
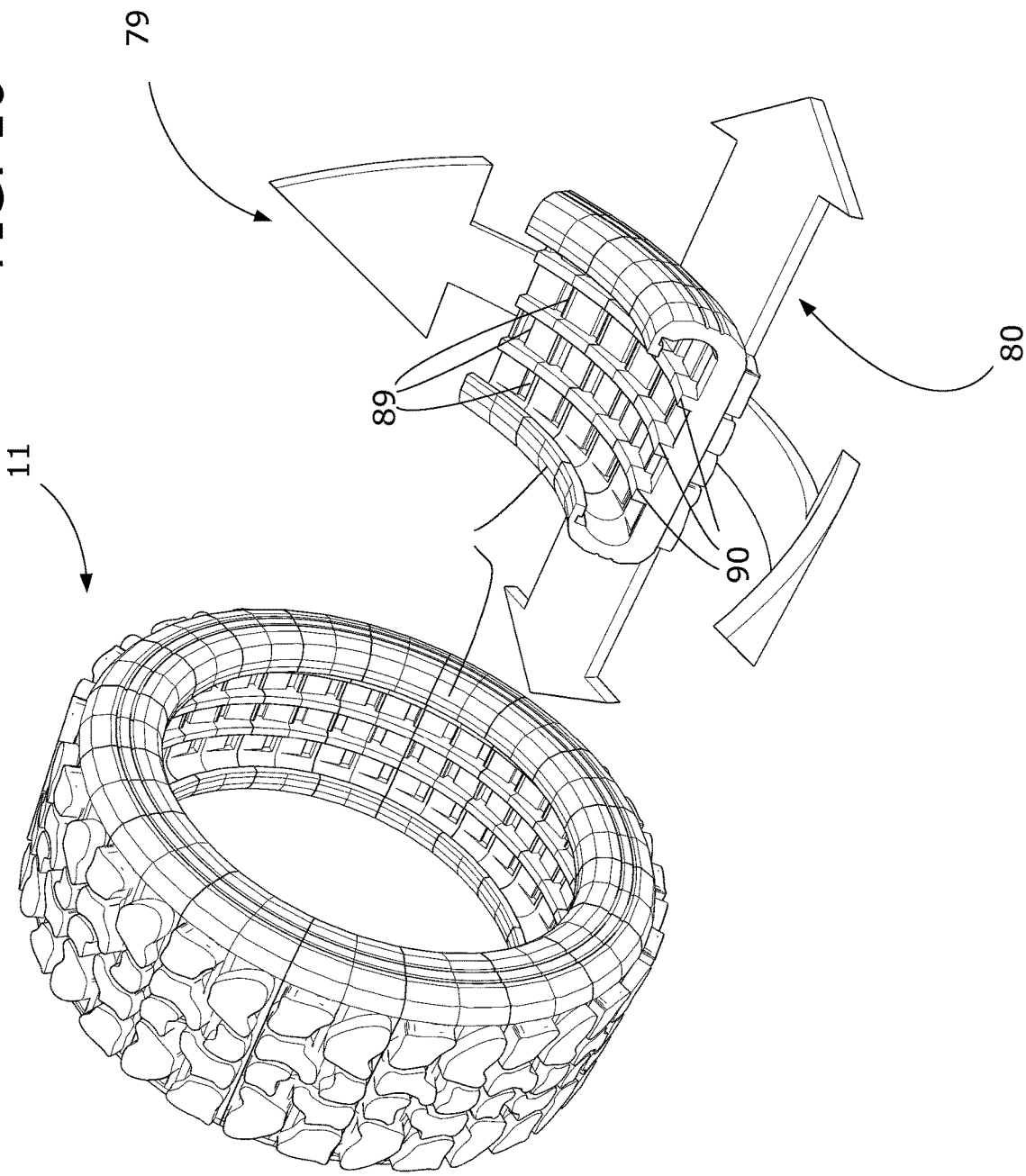
FIG. 10 shows a rubber show used for a spiral spring wheel.

FIG. 10 shows an example configuration of tire tread and tire grooves on spiral spring wheel 10. Within shoe 11, slots 89 prevent slippage of shoe 11 in a direction along axis 79, and ridges 90 prevent slippage of shoe 11 in a direction along axis 80. Slots 89 and ridges 90 interlock and are secured into the valleys of the top surface of leaf spring assembly 12 so that shoe 11 transmits traction for start and stop, and does not unseat sideways when the vehicle is skidding due to sharp turns.

Figure 11:
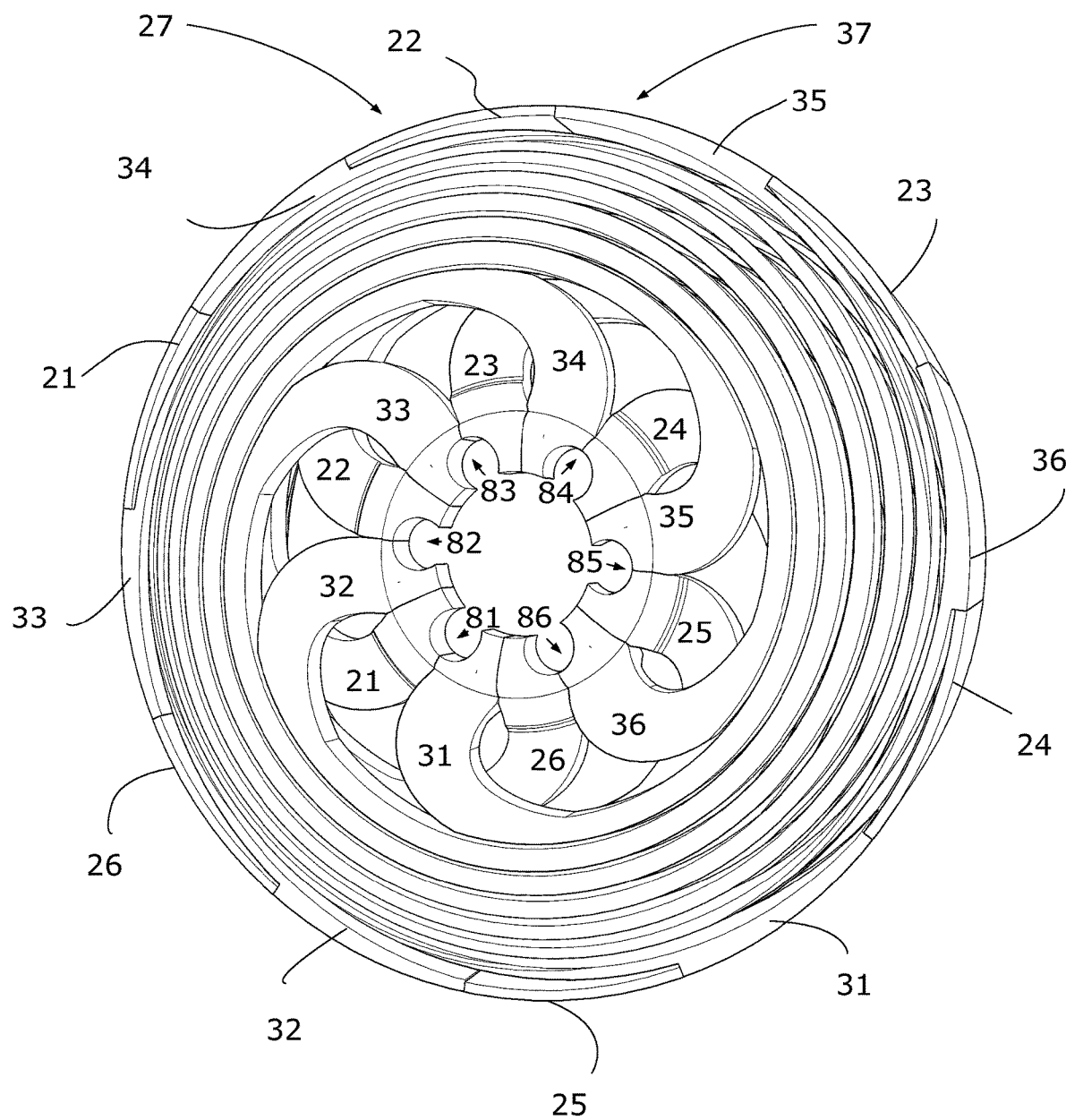
FIG. 11 shows fully assembled torsion springs used in a spiral spring wheel.

FIG. 11 shows main clockwise torsion spring assembly 27 and main counterclockwise torsion spring assembly 37 integrated together. As shown in FIG. 11, torsion springs from main clockwise torsion spring assembly 27 and main counterclockwise torsion spring assembly 37 come together to form a bolt hole 81, a bolt hole 82, a bolt hole 83, a bolt hole 84, a bolt hole 85 and a bolt hole 86 that align with the bolt holes of flange 20.

While spiral spring wheel 10 has twelve torsion springs and flange 20 has six bolt holes and is designed to be attached to a wheel using six nuts, other size wheels may be utilized.

Figure 12:
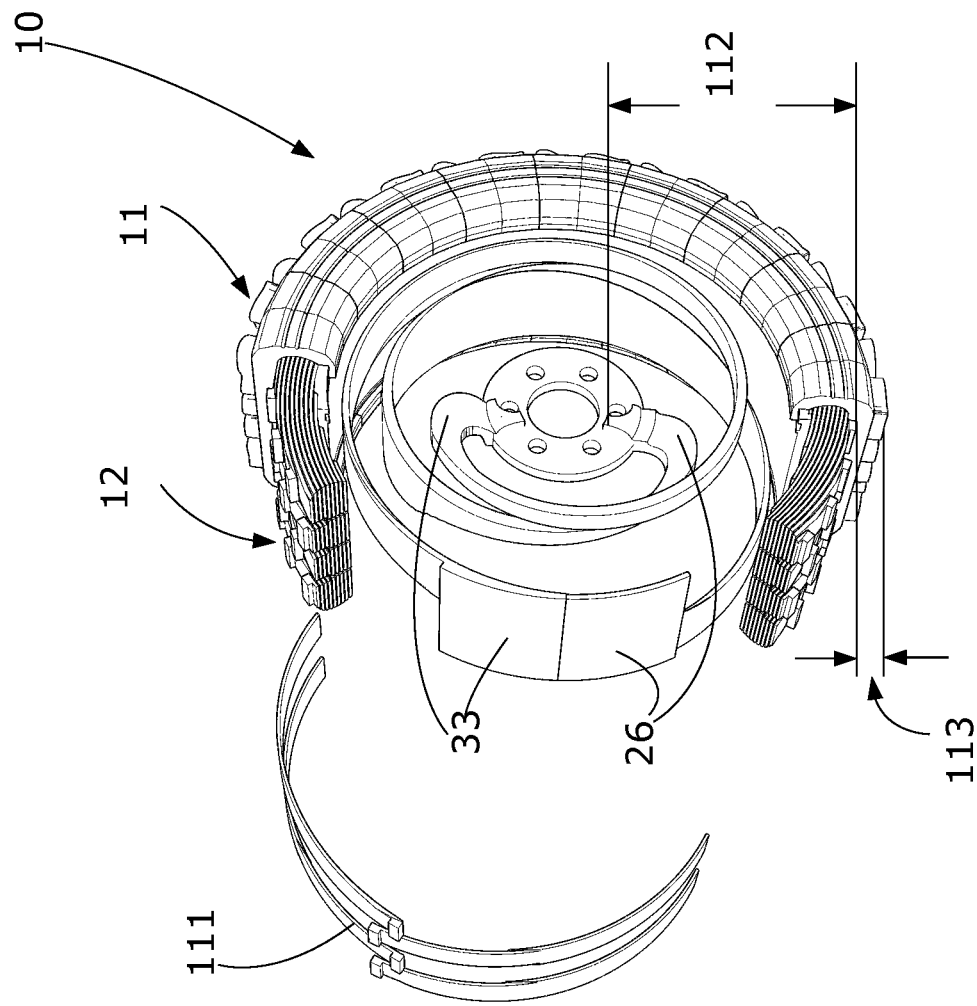
FIG. 12 illustrates differences between a spiral spring wheel and a wheel with a typical non-pneumatic wheel.
Figure 12:
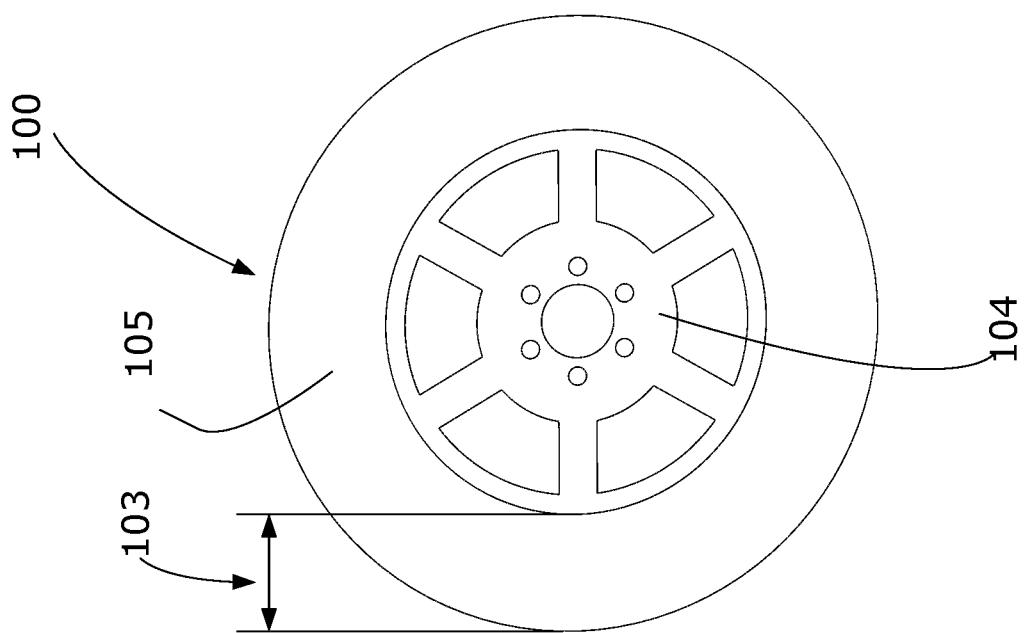

FIG. 12 illustrates differences between spiral spring wheel 10 and a typical currently available non-pneumatic wheel 100. Most currently available non-pneumatic wheels consist of a meta structure, elastic material, resin composition, polymer resin and elastomer. Typically a cell type (chamber style) construction is used to allow for elasticity of the wheel over a relatively small radial distance. Construction styles, include for example, a sponge style (See for example, US 20200139763), a spoke style (See for example, US 20200139754), a mesh style (See for example, US 20200070576) and an annular style (See for example, US 20200009916).

In a typical non-pneumatic wheel 100, a distance 103 from the edge of a hub 104 to a top edge of a sidewall 105 is typically six to eight inches. To obtained a desired level of pliability and durability of the tire, synthetic material is used. Existing steel and steel alloy products are typically do not have sufficient desired level of pliability and durability to operate in this six to eight inch window.

Spiral spring wheel 10, however, expands the distance over which the pliability is achieved, so that steel alloy products can supply a desired level of pliability. In general, elasticity of a material is proportionate to its length, and inversely proportional to its thickness. The use of a spiral shape of the torsion springs in spiral spring wheel 10, increases the length of the torsion springs, thereby increasing the amount of pliability available from where the torsion spring connects to flange 20 to where the torsion spring is in contact with ring spring 13. The spiral shape allows a relatively long torsion spring to be packed into a relatively narrow space between flange 20 and ring spring 13. For example, if the wheel radius is greater than 12 inches, there is plenty of room to implement torsion springs that are seventy to eighty inches long.

As illustrated by FIG. 12, additional pliability is added by the use of leaf spring assembly 12. For example, individual leaf springs 111 shown in a simplified view of leaf spring assembly 12, are typically twenty to thirty inches long. The combined length of leaf spring distance and torsion spring lengths gives the ability to achieve a desired level of pliability over a distance in the range of ninety to one hundred inches. This is all within a radial distance 112 of one spiral spring wheel 10. This allows the alloyed metal of the spiral springs to be thick enough to bear a relatively heavy vehicle weight while long enough to achieve sufficient pliability over the wheel to give a comfortable ride.

In operation, each thin leaf spring absorbs small minor impacts. When the impact is greater, the leaf strings will be stacked and leaf spring assembly 12 transmits the force of the impact through ring spring 13, which absorbs some of the impact, to torsion spring assembly 27 and torsion spring assembly 37.

An effective radial distance 113 of shoe 11 can be relatively small, lessening replacement cost and lessening burden on the environment from disposal of worn out products. For example, shoe 11 is made of synthetic rubber products and is made to be changeable when worn out. For the price of what now is the price of a retread, shoe 11 can be changed. The non-pneumatic design eliminates the occurrence of flat tires, reduces combustibility, results in a bulletproof product. If shoe 11 is torn out or wears out, it will be possible to still effectively drive for short distances.

Figure 13:
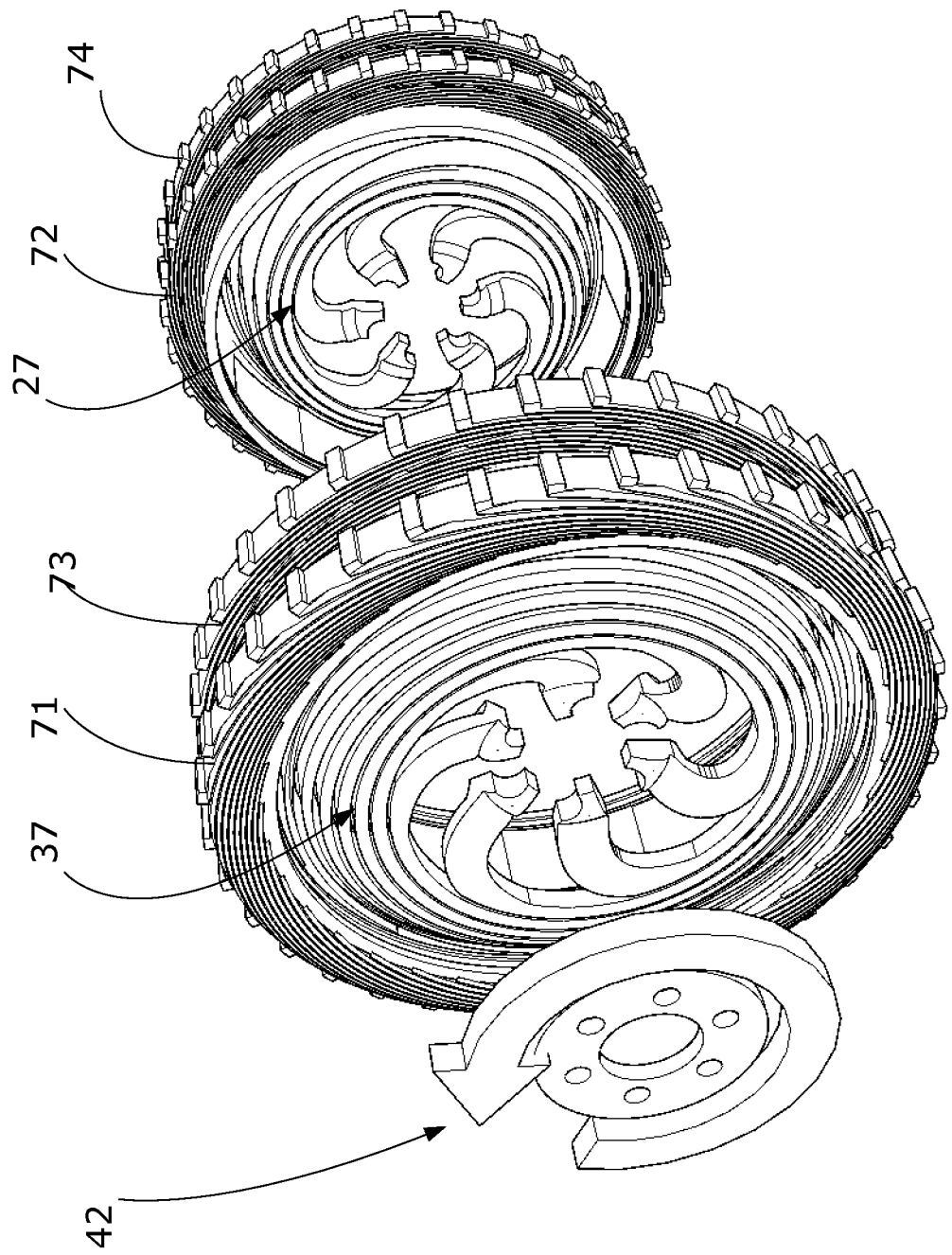
FIG. 13 and FIG. 14 illustrates spring groups including springs in opposite rotation.

Also, the non-pneumatic design of spiral spring wheel 10 increases the efficiency for transferring power from the drive shaft. This is because conveyance of power is more effective through rigid material than through non-metallic material like rubber and resin material inflated with air. To increase traction, spring groups include springs in opposing rotation. For example, the torsion springs of main counterclockwise torsion spring assembly 37 are wound in the opposite direction of the torsion springs of main clockwise torsion spring assembly 27, as shown in FIG. 13. In FIG. 13, arrow 42 represents drive shaft direction when engaging power. As a result, main counterclockwise torsion spring assembly 37, leaf spring group 71 and leaf spring group 71 experience unwinding momentum. This unwinding momentum is counter acted by main clockwise torsion spring assembly 27, leaf spring group 72 and leaf spring group 72 which experience winding momentum.

The rotational acceleration of wheel 10 will place a force on some torsion springs that tend to make the torsion springs in one orientation to unwind, and that tend to make the torsion springs in the opposite orientation to unwind. The winding and unwinding forces increase when starting, stopping, accelerating and decelerating the vehicle. Because within wheel 10, have the torsion springs will tend to be unwinding and half will tend to be winding, there is to a significant degree a cancelling out of the winding and unwinding force with wheel 10. The result is that the performs similar to a solid fixed metal wheel despite the spiral shape springs.

This is illustrated by FIG. 14. In FIG. 14, a ring spring 124 and two torsion springs 123, one in a clockwise orientation and one in a counter-clockwise orientation, are shown. A shaft 121 is turning a flange 122 in a counter clockwise rotation. Illustration 125 and illustration 126 show that as the flange accelerates in a counter-clockwise direction, the torsion spring in the counter-clockwise orientation experiences momentum that tends to unwind the torsion spring. Illustration 127 and illustration 128 show that as the flange accelerates in a counter-clockwise direction, the torsion spring in the clockwise orientation experiences momentum that tends to wind the torsion spring. Illustration 130 illustrates that together the pair of torsion springs counter-act each other so that power is more efficiently transmitted through the springs, not affecting traction. Illustration 131 illustrates that when the wheel encounters an obstacle 132, ring spring 124 and the two torsions springs absorb the upward impact from obstacle 132. This allows impact of absorption of impacts without compromising transfer of power from shaft 121.

While spiral spring wheel 10 has twelve torsion springs and flange 20 has six bolt holes and is designed to be attached to a wheel using six nuts, other size wheels may be utilized.

For example, FIG. 15 shows a spiral spring wheel 91 that has ten torsion springs. The flange for spiral spring wheel 91 has 5 bolt holes and is designed to be attached to a sedan using five nuts. A cutout view 92 of spiral spring wheel 91 is also shown in FIG. 15. FIG. 16 shows spiral spring wheel 93 that has twelve torsion springs. The flange for spiral spring wheel 93 has six bolt holes and is designed to be attached to an off-road vehicle using six nuts. A cutout view 94 of spiral spring wheel 93 is also shown in FIG. 16. FIG. 17 shows a spiral spring wheel 95 that has eight torsion springs. The flange for spiral spring wheel 95 has eight bolt holes and is designed to be attached to an armored vehicle using eight nuts. A cutout view 96 of spiral spring wheel 95 is also shown in FIG. 17. FIG. 18 shows a spiral spring wheel 97 that has eight torsion springs. The flange for spiral spring wheel 97 has ten bolt holes and is designed to be attached as a dual wheel of a freightliner using ten nuts. A cutout view 98 of spiral spring wheel 97 is also shown in FIG. 18.

FIG. 15, FIG. 16, FIG. 17 and FIG. 18 are merely exemplary, as the number of torsion springs, bolt holes, etc., can vary widely dependent upon application, performance requirements, aesthetics and other factors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A spiral spring wheel comprising:
   a ring spring;
   a leaf spring assembly surrounding an outer surface of the ring spring;
   a shoe placed over the leaf spring assembly, the shoe having sidewalls that extend past the leaf spring assembly and tuck under the ring spring;
   a flange;
   a first plurality of torsion springs, each of the torsion springs in the first plurality of torsion springs extending in a clockwise spiral shape from the flange to an inner surface of the ring spring; and,
   a second plurality of torsion springs, each of the torsion springs in the second plurality of torsion springs extending in a counterclockwise spiral shape from the flange to the inner surface of the ring spring;
   wherein each side of two sides of an inner surface of the ring spring includes a ridge; and
   wherein each ridge locks into a matching groove at a bottom of each of the sidewalls of the shoe.

2. A spiral spring wheel as in claim 1, wherein each torsion spring in the first plurality of springs has a first end connected to the flange and has a second end having a platform that is curved to fit flat against the inner surface of the ring spring; and
   each torsion spring in the second plurality of springs has a first end connected to the flange and has a second end having a platform that is curved to fit flat against the inner surface of the ring spring.

3. A spiral spring wheel as in claim 1, wherein the leaf spring assembly includes a plurality of leaf spring groups, each leaf spring group having a plurality of leaf springs, each leaf spring including a protuberance that fits into a matching slot within an inner surface of the shoe.

4. A spiral spring wheel as in claim 1:
wherein the leaf spring assembly includes a plurality of leaf spring groups, each leaf spring group having a plurality of leaf springs, each leaf spring including a protuberance that fits into a matching slot within an inner surface of the shoe; and
wherein ridges along an inner surface of the shoe form a separate slot for each leaf spring group that hold each leaf spring group in position between the ring spring and the shoe.

5. A spiral spring wheel as in claim 1:
wherein the leaf spring assembly includes a plurality of leaf spring groups, each leaf spring group having a plurality of leaf springs; and
wherein ridges along an inner surface of the shoe form a separate slot for each leaf spring group that hold each leaf spring group in position between the ring spring and the shoe.

6. A spiral spring wheel as in claim 1:
wherein the leaf spring assembly includes a plurality of leaf spring groups, each leaf spring group having a plurality of leaf springs;
wherein a first subset of the leaf spring groups are wound in a clockwise direction around the ring spring; and
wherein a second subset of the leaf spring groups are wound in a counter-clockwise direction around the ring spring.

7. A spiral spring wheel comprising:
a ring spring;
a leaf spring assembly surrounding an outer surface of the ring spring;
a shoe placed over the leaf spring assembly, the shoe having sidewalls that extend past the leaf spring assembly and tuck under the ring spring;
a flange;
a first plurality of torsion springs, each of the torsion springs in the first plurality of torsion springs extending in a clockwise spiral shape from the flange to an inner surface of the ring spring; and,
a second plurality of torsion springs, each of the torsion springs in the second plurality of torsion springs extending in a counterclockwise spiral shape from the flange to the inner surface of the ring spring;
wherein the ring spring includes slots into which aid to secure and seal the shoe to the ring spring.

8. A spiral spring wheel as in claim 1, wherein ridges within an underside of the shoe interlock and are secured into valleys of a top surface of the leaf spring assembly.

9. A spiral spring wheel comprising:
a ring spring;
a leaf spring assembly surrounding an outer surface of the ring spring;
a shoe placed over the leaf spring assembly, the shoe having sidewalls that extend past the leaf spring assembly and tuck under the ring spring;
a flange;
a first plurality of torsion springs, each of the torsion springs in the first plurality of torsion springs extending in a clockwise spiral shape from the flange to an inner surface of the ring spring; and,
a second plurality of torsion springs, each of the torsion springs in the second plurality of torsion springs extending in a counterclockwise spiral shape from the flange to the inner surface of the ring spring;
wherein each side of two sides of an inner surface of the ring spring includes a ridge;
wherein each ridge locks into a matching groove at a bottom of each of the sidewalls of the shoe; and
wherein the ring spring includes slots into which aid to secure and seal the shoe to the ring spring.

10. A spiral spring wheel as in claim 1 wherein the flange has six bolt holes, and the first plurality of torsion springs includes six torsion springs and the second plurality of torsion springs includes six torsion springs.

11. A spiral spring wheel as in claim 1 wherein the flange has five bolt holes, and the first plurality of torsion springs includes five torsion springs and the second plurality of torsion springs includes five torsion springs.

12. A spiral spring wheel as in claim 1 wherein the flange has eight bolt holes, and the first plurality of torsion springs includes four torsion springs and the second plurality of torsion springs includes four torsion springs.

13. A spiral spring wheel as in claim 1 wherein the flange has ten bolt holes, and the first plurality of torsion springs includes four torsion springs and the second plurality of torsion springs includes four torsion springs.

14. A spiral spring wheel as in claim 7, wherein each torsion spring in the first plurality of springs has a first end connected to the flange and has a second end having a platform that is curved to fit flat against the inner surface of the ring spring; and
each torsion spring in the second plurality of springs has a first end connected to the flange and has a second end having a platform that is curved to fit flat against the inner surface of the ring spring.

15. A spiral spring wheel as in claim 7, wherein the leaf spring assembly includes a plurality of leaf spring groups, each leaf spring group having a plurality of leaf springs, each leaf spring including a protuberance that fits into a matching slot within an inner surface of the shoe.

16. A spiral spring wheel as in claim 7:
wherein the leaf spring assembly includes a plurality of leaf spring groups, each leaf spring group having a plurality of leaf springs, each leaf spring including a protuberance that fits into a matching slot within an inner surface of the shoe; and
wherein ridges along an inner surface of the shoe form a separate slot for each leaf spring group that hold each leaf spring group in position between the ring spring and the shoe.

17. A spiral spring wheel as in claim 7:
wherein the leaf spring assembly includes a plurality of leaf spring groups, each leaf spring group having a plurality of leaf springs; and
wherein ridges along an inner surface of the shoe form a separate slot for each leaf spring group that hold each leaf spring group in position between the ring spring and the shoe.

18. A spiral spring wheel as in claim 7:
wherein the leaf spring assembly includes a plurality of leaf spring groups, each leaf spring group having a plurality of leaf springs;
wherein a first subset of the leaf spring groups are wound in a clockwise direction around the ring spring; and
wherein a second subset of the leaf spring groups are wound in a counter-clockwise direction around the ring spring.

19. A spiral spring wheel as in claim 9, wherein each torsion spring in the first plurality of springs has a first end connected to the flange and has a second end having a platform that is curved to fit flat against the inner surface of the ring spring; and each torsion spring in the second plurality of springs has a first end connected to the flange and has a second end having a platform that is curved to fit flat against the inner surface of the ring spring.

20. A spiral spring wheel as in claim 9, wherein the leaf spring assembly includes a plurality of leaf spring groups, each leaf spring group having a plurality of leaf springs, each leaf spring including a protuberance that fits into a matching slot within an inner surface of the shoe.

\* \* \* \* \*